United States Patent Office 3,547,962
Patented Dec. 15, 1970

3,547,962
PHASE TRANSFER AGENT IN OXIDATION OF OLEFINS
Charles M. Starks and Paul H. Washecheck, Ponca City, Okla., assignors to Continental Oil Company, Ponca City, Okla., a corporation of Delaware
No Drawing. Continuation-in-part of application 785,385, Dec. 19, 1968. This application Mar. 7, 1969, Ser. No. 805,362
Int. Cl. C08h 17/36
U.S. Cl. 260—413          4 Claims

ABSTRACT OF THE DISCLOSURE

Tertiary amines are disclosed as excellent phase transfer agents for oxidation of olefins with oxidizing agents in a mixed aqueous phase oxidation.

This is a continuation-in-part of U.S. Pat. Ser. No. 785,385, filed Dec. 19, 1968, now abandoned.

BACKGROUND OF INVENTION
Field of invention

This invention relates to the oxidation of olefins with oxidizing agents in an aqueous system, with or without a catalyst (depending upon the oxidizing agent selected).

Description of prior art

It is known that sodium metaperiodate in the presence of a catalytic amount of osmium reacts with olefins to produce aldehydes (see R. Pappo et al., J. Organic Chemistry, 21, 478–479 (1956)). With ruthenium tetraoxide the olefins are oxidized to carboxylic acids (see R. Pappo and A. Becker, Bulletin of Research Council of Israel 5A, 300–301 (1956) and G. Stork, A. Meisels and J. E. Davies, J. Am. Chem. Soc., 85 3419 (1963)). It is also known to oxidize olefins with paraperiodic acid in the presence of osmium tetraoxide. U.S. Pat. 3,057,915, Riemenschneider et al., disclosed carrying out such a reaction in vapor phase wherein the vapors are saturated with water. It is obvious that carrying out the reaction in liquid phase would be less costly and has other advantages. In fact, it has been demonstrated that the use of paraperiodic acid instead of the sodium metaperiodate improves the yield of the aldehyde product. The reaction can be illustrated as follows:

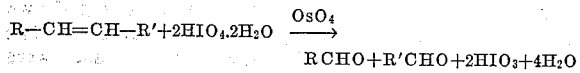

$$R-CH=CH-R'+2HIO_4 \cdot 2H_2O \xrightarrow{OsO_4} RCHO+R'CHO+2HIO_3+4H_2O$$

The rate of oxidation of olefins is slow if a water-immiscible organic solvent for the olefin is used in the reaction. This can be overcome by using a solvent which is miscible with both the olefin and the aqueous solution of the acid or by increasing the amount of catalyst. These approaches, however, have their disadvantages. Suitable solvents are not readily available and, even when used, pose a separation problem. The second alternative requires unnecessarily an excess of the catalyst.

SUMMARY OF INVENTION

According to this invention an organic-soluble tertiary amine is utilized in liquid phase oxidation of olefins with aqueous oxidizing agents in the presence of aqueous catalysts.

DETAILED DESCRIPTION

In carrying out the process of the invention, it is only necessary that the reactants, e.g., olefin and oxidizing agent aqueous solution be in the liquid state. Preferably the olefin will be in a hydrocarbon solvent. The pressure can vary over a wide range as well as can the temperature. Normally, ambient temperature will be utilized and sufficient pressure to maintain the olefin in the liquid state. In most cases, atmospheric pressure is utilized except with such low boiling olefins such as ethylene, propylene and the like. Thus the normal temperature range will be 30 to 100° C. and only sufficient pressure utilized to maintain the system in the liquid state. The reaction can be carried out at subambient temperatures or even under vacuum; however, as with most reactions, temperature and pressure enhance the reaction so no advantage is gained by lowering temperature or pressure. The reaction proceeds normally at ambient conditions; and, thus, economically, one would not normally choose to use high temperatures and pressures. The reaction is exothermic; therefore, the temperature will be in excess of room temperature after the reaction is initiated. If one so desires, he could utilize much higher temperatures and pressures; but, again, this is not necessary, however, it is pointed out that temperatures and pressures can be varied widely if desired.

The olefins which can be oxidized by the method of this reaction include those compounds having one or more olefinic unsaturations and can be aliphatic, cycloaliphatic, or aryl olefins. The aromatic-olefins and cyclo-olefins can have alkyl substituents, and the aliphatic olefins can be normal or branched. These olefinic compounds can vary in molecular size over a wide range so long as they are liquid at reaction conditions. It should be obvious that the molecular size would not affect the oxidation. For example, the aliphatic olefins can contain 2 to 50 carbon atoms or more. Most generally, the olefins of interest will contain 4 to 30 carbon atoms. The cyclo-olefins generally contain 4 to 34 carbon atoms, preferably 4 to 8 carbon atoms. The aryl olefins can be mono or poly nuclear but most generally will contain one or two rings. Here, again, the carbon atom range can be up to 50 carbon atoms or more, the lower limit being obviously 8, e.g., styrene, and most generally they will be styrene or alkyl substituted styrene of 8 to 18 carbon atoms.

Examples of such olefins include ethylene; pentene-2; octadiene-1,5; dodecene-4; pentacosene-6; nonacosene-3; hexatriacontene-1; pentacontene-15; 3-methylhexene-1; 4-ethyloctene-2; 2-ethyl-5-butyl-23-hexyl-33-propylpentatriacontene-3; cyclobutene; cyclohexene; cyclododecene; cyclotriacontene; 1-ethyl-4-propyl-cyclooctene; 1-ethyl-3-butyl-5-pentylcyclododecene; styrene; 3-methyl-styrene; stilbene; tetraphenylethylene; vinylnaphthalene; vinylanthracene; 4-butyl-1-vinyl-naphthalene; 2,7-diphenyldodecene-3; 1-hexene; 1-octene; 1-decene; 1-dodecene; 1-tetradecene, internal isomers of decene; dodecene; tetradecene; hexadecene; octadecene; eicosene, vinylcyclohexene; 1,3-butadiene or alkyl substituted butadiene; vinyl chloride; vinyl acetate; oleic acid; linoleic acid; and the like, such compounds being well known to the art.

Suitable oxidizing agents are periodic acid or potassium permanganate, although, since the invention centers around the use of tertiary amines as phase transfer agents, it will be apparent to those skilled in the art that other aqueous oxidizing agents can be developed for use in this process.

The catalysts which are useful in this invention are the tetraoxides of osmium and ruthenium; however, the osmium or ruthenium can be added as the pure metal in finely divided state, the lower oxides or as a salt such as the halides, preferably chlorides, sulfates, acetates, adipates, nitrates, citrates, hydroxides and the like or the paraperiodic acid will oxidize the metal to the active tetraoxide. Obviously, it is preferable to add the metal as the tetraoxide since any paraperiodic acid utilized for oxidizing the catalyst is not available for oxidizing the olefin. As is true with most catalysts, only small quantities are employed, usually 0.05 percent to 2 percent; however, smaller amounts can sometimes be employed and larger amounts, while not needed, are not objectionable. A catalyst of this type is not necessary when potassium permanganate is used as the oxidizing agent.

Tertiary amines are also well known in the art. Such compounds can be represented by the formula:

wherein:

R' is an acyclic, alicyclic, bicyclic or aryl group but is preferably an alkyl having from 8 to 30 carbon atoms;
R is an acyclic, alicyclic, bicyclic or aryl group; and
R'' is an acyclic, alicyclic, bicyclic or aryl group.

A wide variety of tertiary amines can be used in this process. The compound can contain three identical alkyl or aryl groups or three dissimilar groups. The substituents can be acyclic, alicyclic, bicyclic or aryl groups or the nitrogen can be contained in one or more rings. At least one of the alkyl groups would preferably be a rather large organic moiety (8 to 30 carbon atoms) to insure greater solubility in the organic phase. Such compounds include:

Trimethylamine
Triethylamine
Tri-n-propylamine
Tri-i-propylamine
Tri-n-butylamine
Tri-i-butylamine
Tripentylamine
Trihexylamine
Triheptylamine
Trioctylamine
Trinonylamine
Tridecylamine
Triundecylamine
Tridodecylamine
Tri(tridecyl)amine
Tri(tetradecyl)amine
Tri(pentadecyl)amine
Tri(hexadecyl)amine
Tristearylamine
Tricyclohexylamine
Tribenzylamine
Triphenylamine
N-methyldihexylamine
N-methyldioctylamine
N-methyldiheptylamine
N-methyldinonylamine
N-methyldidecylamine
N-methyldiundecylamine
N-methyldidodecylamine
N-methylditridecylamine
N-methylditetradecylamine
N-methyldipentadecylamine
N-methyldihexadecylamine
N-methyldistearylamine
N-methyldicyclohexylamine
N-methyldibenzylamine
N,N-dimethylhexylamine
N,N-dimethylheptylamine
N,N-dimethyloctylamine
N,N-dimethylnonylamine
N,N-dimethyldecylamine
N,N-dimethyldodecylamine
N,N-dimethyltridecylamine
N,N-dimethyltetradecylamine
N,N-dimethylpentadecylamine
N,N-dimethylhexadecylamine
N,N-dimethylstearylamine
N,N-dimethylcyclohexylamine
N,N-dimethylbenzylamine
N,N,N',N'-tetramethylethylenediamine
N,N,N',N'-tetramethyltetramethylenediamine
N,N,N',N'-tetramethylhexamethylenediamine
N,N-dimethylaniline
Pyridine
2-methylpyridine
4-methylpyridine
Lutidine Sufficient tertiary amine is utilized to solubilize the metallic catalyst and to stabilize the oxidizing agents and will depend somewhat on the particular tertiary amine and the amount of catalyst present. Generally we prefer to use 0.1 to 5 percent tertiary amine based on the olefin containing solution (olefin and solvent).

The following examples illustrate the invention:

EXAMPLE I

Two reactions (A and B), identical in all respects except for the presence of a tertiary amine, were carried out. An aqueous solution, 500 ml., or paraperiodic acid (100.30 g., 0.44 mole) was placed in each of two three-necked flasks equipped with magnetic stirrers, thermometers and condensers. To each flask was added solid ruthenium dioxide (0.0535 g., 0.004 mole). The black solid immediately reacted to form a yellow solution of ruthenium tetraoxide.

To Flask A was added a solution of 1-octene (11.22 g., 0.1 mole) dissolved in 100 ml. of hexane. The mixture was stirred at 27° C. The temperature of the reaction mixture slowly rose to 32° C. and then declined.

To Flask B was added a solution of 1-octene (11.22 g., 0.1 mole) and tridodecylamine (°.5 g.) dissolved in 100 ml. of hexane. The reaction mixture was stirred at 27° C. The reaction mixture exothermed to 35° C. and then slowly declined.

Aliquots of each reaction mixture were withdrawn periodically and analyzed by gas chromatography. The thermal response factors of 1-octene and heptanal were determined from standard solutions assuming the thermal response factor of heptanoic acid was 1.0. The thermal response factors for all impurities were assumed to be 1.0. The data listed in Table I indicate the weight percent of the three major components versus time.

TABLE I.—OXIDATION OF OLEFINS

| | Reaction A (no promoter) | | | Reaction B (tertiary amine) | | |
|---|---|---|---|---|---|---|
| Time (hours: | 1-octene | Heptanal | Heptanoic acid | 1-octene | Heptanal | Heptanoic acid |
| ½ | 91.5 | 4.9 | 1.7 | 97.9 | 1.0 | 0.0 |
| 1 | 87.2 | 8.5 | 3.5 | 90.9 | 2.9 | 4.3 |
| 2 | 84.3 | 6.7 | 7.9 | 75.7 | 5.0 | 15.9 |
| 4 | 81.0 | 8.6 | 9.3 | 46.5 | 7.6 | 39.4 |
| 6 | 78.2 | 15.6 | 5.7 | 20.7 | 6.6 | 63.2 |
| 8 | 78.1 | 6.1 | 14.3 | 0.0 | 2.2 | 87.4 |
| 24 | 72.6 | 12.8 | 13.6 | 0.0 | 0.0 | 93.2 |

The experimental conditions described above are only representative. Tridodecylamine is only typical of many tertiary amines which would be effective. The concentrations of paraperiodic acid and ruthenium dioxide are only representative. It would be advantageous to operate at a high periodic acid concentration to insure maximum rate of reaction. However, it would be advantageous to use as low a concentration of ruthenium dioxide as feasible and which would still maintain a reasonable reaction rate since ruthenium dioxide is expensive. The solvent, hexane, is not an essential part of the invention although it has been shown that ruthenium tetraoxide attacks most common solvents except paraffins and chlorinated hydrocarbons such as carbon tetrachloride and chloroform. Only one temperature (25–30° C.) was examined. The process is operable in other ranges and would proceed more rapidly at higher temperatures. Although 1-octene was used in the example, the invention would not be limited to only 1-olefins. Internal olefins could also be oxidized by this method. It is to be noted that in this experiment the tertiary amine acts as a promoter of the reaction and does not appear to be acting as a phase transfer agent in the true sense.

EXAMPLE II

Two runs were set up. The desired quantity of paraperiodic acid was weighed and dissolved in water (400 ml.). A known volume of a standard solution (1 g./250 ml.) of osmium tetraoxide was pipetted into the periodic acid solution. The aqueous solution was diluted to exactly 500 ml. in a volumetric flask. This solution was then transferred to a one liter three-necked flask equipped with nitrogen inlet, thermometer, condenser and magnetic stirrer. A nitrogen purge (25 ml./min.) was started. The olefin solution was prepared by adding 1-octene (11.22 g., 0.1 mole) and tetradecane (1.00 g.) to 100 ml. benzene. Tridecylamine (0.5 g.) was also added to this solution. The benzene solution was added to the aqueous solution and samples of the benzene layer were taken periodically and analyzed by gas chromatography using tetradecane as an internal standard. Results are listed in Table II with the data in weight percent:

| Run No.: | $H_5IO_6$ | $OsO_4$ | Phase transfer agent |
|---|---|---|---|
| 1 | 0.2016 | 0.0004 | None. |
| 2 | 0.4400 | 0.0004 | Tridodecylamine. |

TABLE II.—OXIDATION OF OLEFINS

| | Run I | | | Run II | | |
|---|---|---|---|---|---|---|
| | 1-octene | Heptanal | Heptanoic acid | 1-octene | Heptanal | Heptanoic acid |
| Time, min.: | | | | | | |
| 15 | 99.6 | 0.4 | 0.0 | 93.2 | 4.1 | 2.7 |
| 30 | 99.3 | 0.8 | 0.0 | 82.2 | 11.4 | 6.4 |
| 45 | 99.0 | 1.0 | 0.0 | 63.9 | 24.6 | 11.5 |
| 60 | 98.7 | 1.3 | 0.0 | 36.9 | 48.3 | 14.8 |
| 120 | 98.4 | 1.6 | 0.0 | 2.2 | 78.0 | 19.8 |
| 240 | 97.3 | 2.7 | | | | |

EXAMPLE III 1-tetradecene (3.92 g., 0.02 mole) and the phase transfer agent (type and concentration specified) were dissolved in benzene (100 ml.) and placed in a two liter, three-necked, round bottom flask. The flask was equipped with a condenser, magnetic stirrer, addition funnel and thermometer. An aqueous solution (1000 ml.) containing polyphosphoric acid (100 ml.) and potassium permanganate (15.80 g., 0.10 mole) was slowly added. The reaction mixture was allowed to stir overnight. The mixture was then extracted with pentane to remove the organic layer. The solvent was removed leaving the product and any unreacted olefin behind. This product mixture was analyzed by standard techniques to determine the acid and olefin content.

Two reactions were carried out for a comparison. Reaction A contained no phase transfer agent. Reaction B contained 0.5 g. of tridodecyl amine as the phase transfer agent.

Table III shows the results of the analyses of the products.

TABLE III

| Run No. | Acid No. | Iodine No. |
|---|---|---|
| A | 147 | 24.8 |
| B | 215 | 3.5 |
| Theoretical for unreacted 1-tetradecene | 0 | 129.0 |
| Theoretical for tridecanoic acid | 262 | 0.0 |

Having thus described the invention by providing specific examples thereof, it is to be understood that no undue limitations or restrictions are to be drawn by reason thereof and that many variations and modifications are within the scope of the invention.

What is claimed is:

1. In the liquid phase oxidation of olefins with oxidizing agents selected from the group consisting of paraperiodic acid and potassium permanganate, the improvement comprising carrying out the oxidation in the presence of about 0.1 to about 5 weight percent, based on the olefin-containing solution, of a tertiary amine having the formula:

wherein:

R' is an alkyl having from 8 to 30 carbon atoms; R is an acyclic, alicyclic, bicyclic or aryl groups; and R" is an acyclic, alicyclic, bicyclic or aryl group.

2. The improvement of claim 1 wherein the oxidizing agent is periodic acid and the reaction is carried out in the presence of a catalyst selected from the group consisting of osmium tetraoxide and ruthenium tetraoxide.

3. The improvement of claim 1 wherein the olefin is an aliphatic olefin of 4 to 30 carbon atoms.

4. The improvement of claim 1 wherein the tertiary amine is tridodecylamine.

References Cited

UNITED STATES PATENTS 3,383,398   5/1968   Peck et al. _____ 260—413

LEWIS GOTTS, Primary Examiner

E. G. LOVE, Assistant Examiner

U.S. Cl. X.R.

260—533, 601